(12) United States Patent
Chatterji et al.

(10) Patent No.: US 7,147,705 B2
(45) Date of Patent: Dec. 12, 2006

(54) METHODS, CEMENT COMPOSITIONS AND OIL SUSPENSIONS OF POWDER

(75) Inventors: Jiten Chatterji, Duncan, OK (US); Ronney R. Koch, Duncan, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/244,027

(22) Filed: Oct. 5, 2005

(65) Prior Publication Data
US 2006/0048683 A1 Mar. 9, 2006

Related U.S. Application Data

(62) Division of application No. 10/695,892, filed on Oct. 29, 2003, now Pat. No. 6,983,800.

(51) Int. Cl.
C04B 24/00 (2006.01)
(52) U.S. Cl. .................. 106/696; 106/718; 106/724; 106/737; 106/778; 106/823
(58) Field of Classification Search ............... 106/718, 106/823, 724, 737, 778, 696
See application file for complete search history.

(56) References Cited

U.S. PATENT DOCUMENTS

| | | |
|---|---|---|
| 2,801,931 A | 8/1957 | Morgan et al. |
| 2,805,719 A | 9/1957 | Anderson |
| 2,890,752 A | 6/1959 | Crone et al. |
| 2,945,539 A * | 7/1960 | Eilers |
| 3,131,075 A | 4/1964 | Brooks, Jr. |
| 3,242,986 A | 3/1966 | Hower |
| 3,360,046 A | 12/1967 | Johnson et al. |
| 3,582,375 A * | 6/1971 | Tragesser |
| 3,784,499 A | 1/1974 | Krupnick et al. |
| 3,861,467 A | 1/1975 | Harnsberger |
| 3,902,911 A | 9/1975 | Messenger |
| 3,985,593 A | 10/1976 | Machacek |
| 4,081,299 A | 3/1978 | Griffith |
| 4,104,092 A | 8/1978 | Mullay |
| 4,234,344 A | 11/1980 | Tinsley et al. |
| 4,370,166 A | 1/1983 | Powers et al. |
| 4,384,896 A | 5/1983 | Aitcin et al. |
| 4,515,635 A | 5/1985 | Rao et al. |
| 4,543,137 A | 9/1985 | Edamura et al. |
| 4,555,269 A | 11/1985 | Rao et al. |
| 4,557,763 A | 12/1985 | George et al. |
| 4,565,578 A | 1/1986 | Sutton et al. |
| 4,618,376 A | 10/1986 | Saternus et al. |
| 4,623,390 A | 11/1986 | Delmonico |
| 4,687,516 A | 8/1987 | Burkhalter et al. |
| 4,721,160 A | 1/1988 | Parcevaux et al. |
| 4,829,107 A | 5/1989 | Kindt et al. |
| 4,897,119 A | 1/1990 | Clarke et al. |
| 4,904,709 A | 2/1990 | Hermele |
| 4,933,031 A | 6/1990 | Blomberg et al. |
| 4,935,060 A | 6/1990 | Dingsoyr |
| 5,028,482 A | 7/1991 | Jefs |
| 5,149,370 A | 9/1992 | Olaussen et al. |
| 5,151,131 A | 9/1992 | Burkhalter et al. |
| 5,158,613 A | 10/1992 | Sargeant et al. |
| 5,207,832 A | 5/1993 | Baffreau et al. |
| 5,292,512 A | 3/1994 | Schaefer et al. |
| 5,346,012 A | 9/1994 | Heathman et al. |
| 5,348,584 A | 9/1994 | Brothers et al. |
| 5,489,574 A | 2/1996 | Miano et al. |
| 5,711,383 A * | 1/1998 | Terry et al. .................. 166/295 |
| 5,919,842 A | 7/1999 | Mounsey |
| 6,060,434 A * | 5/2000 | Sweatman et al. .......... 507/216 |
| 6,060,535 A | 5/2000 | Villar et al. |
| 6,136,867 A | 10/2000 | Foulin et al. |
| 6,153,562 A | 11/2000 | Villar et al. |
| 6,156,808 A | 12/2000 | Chatterji et al. |
| 6,173,778 B1 | 1/2001 | Rae et al. |
| 6,196,316 B1 | 3/2001 | Bosma et al. |
| 6,210,476 B1 | 4/2001 | Chatterji et al. |
| 6,258,160 B1 | 7/2001 | Chatterji et al. |
| 6,268,406 B1 | 7/2001 | Chatterji et al. |
| 6,297,202 B1 | 10/2001 | Chatterji et al. |
| 6,471,975 B1 | 10/2002 | Banovetz et al. |
| 6,601,647 B1 | 8/2003 | Brothers et al. |
| 6,631,766 B1 | 10/2003 | Brothers et al. |
| 6,644,405 B1 | 11/2003 | Vijn et al. |
| 6,648,961 B1 | 11/2003 | Brothers et al. |
| 6,660,078 B1 | 12/2003 | Brothers et al. |
| 6,666,268 B1 * | 12/2003 | Griffith et al. ............... 166/292 |
| 6,668,929 B1 * | 12/2003 | Griffith et al. ............... 166/292 |
| 6,716,282 B1 * | 4/2004 | Griffith et al. ............... 106/705 |
| 6,762,156 B1 | 7/2004 | Heathman et al. |
| 2004/0221990 A1 * | 11/2004 | Heathman et al. .......... 166/292 |

FOREIGN PATENT DOCUMENTS

| | | |
|---|---|---|
| CN | 1250071 | 4/2000 |
| DE | 3522677 | 1/1987 |
| DE | 296 474 A5 | 12/1991 |

(Continued)

OTHER PUBLICATIONS

Smith, Dwight K., paper entitled "Cementing", 1990, pp. 21-27.

(Continued)

Primary Examiner—Paul Marcantoni
(74) Attorney, Agent, or Firm—Craig W. Roddy; Fletcher Yoder

(57) ABSTRACT

Methods, cement compositions and oil suspensions of powders selected from the group consisting of micro-silica, silica flour, fine silica flour, silica sand, fine particle size cement, ultra-fine particle size cement, fly ash, slag, vitrified shale and zeolite.

30 Claims, No Drawings

FOREIGN PATENT DOCUMENTS

| | | |
|---|---|---|
| EP | 0492087 | 7/1992 |
| EP | 650942 | 5/1995 |
| EP | 0 748 782 A1 | 12/1996 |
| EP | 0 886 628 | 9/1997 |
| EP | 814067 | 12/1997 |
| EP | 0 832 861 B1 | 7/2001 |
| EP | 1 348 677 A2 | 10/2003 |
| ES | 2114781 | 6/1998 |
| FR | 2779425 | 12/1999 |
| GB | 1 436 811 | 5/1976 |
| JP | 2001019421 A | 1/2001 |
| JP | 2001354408 A | 12/2001 |
| JP | 2002145609 A | 5/2002 |
| JP | 2002193701 | 7/2002 |
| JP | 2003268371 * | 9/2003 |
| JP | 2003176123 A | 6/2006 |
| NO | 167649 | 4/2002 |
| WO | WO 90/11977 | 10/1990 |
| WO | WO 93/09332 | 5/1993 |
| WO | WO 98/38855 | 9/1998 |

OTHER PUBLICATIONS

Grace Construction Products brochure entitled "Force 10,000® Mechanical Propertis of Force 10,000 Microsilica Concrete".

Grace Construction Products brochure entitled "Force 10,000® D High Performance Concrete Admisture Dry Densified Powder".

Grace Construction Products brochure entitled "Force 10,000® Water and Gas Permeability of Force 10,000® Microsilica Concrete".

Halliburton brochure entitled "Spherelite Cement Additive" dated 1999.

Halliburton brochure entitled "SSA-1 Strength-Stabilizing Agent" dated 1998.

Halliburton brochure entitled "MICROSAND Cement Additive" dated 1999.

Halliburton brochure entitled "SSA-2 Coarse Silica Flour" dated 1999.

Halliburton brochure entitled "Microblock Cement Additive" dated 1999.

Halliburton brochure entitled "Silicalite Cement Additive" dated 1999.

Halliburton brochure entitled "Halad® -322 LXP Fluid-Loss Additive" dated 1999.

Foreign communication from a related counterpart application dated Feb. 21, 2005.

* cited by examiner

METHODS, CEMENT COMPOSITIONS AND OIL SUSPENSIONS OF POWDER

CROSS-REFERENCE TO RELATED APPLICATION

This is a divisional of application Ser. No. 10/695,892 filed Oct. 29, 2003, now U.S. Pat. No. 6,983,800.

BACKGROUND OF THE INVENTION

1. Field of the Invention

The present invention relates to methods of cementing subterranean zones, cement compositions and oil suspensions of powder useful in cement compositions.

2. Description of the Prior Art

Hydraulic cement compositions are utilized in cementing subterranean zones penetrated by well bores. For example, hydraulic cement compositions are used in primary well cementing operations whereby strings of pipe such as casings and liners are cemented in well bores. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

In primary well cementing and in other subterranean cementing operations, large quantities of crystalline and amorphous silica powder are often included in the cement compositions utilized. Crystalline silica powder is included in cement compositions to prevent cement compressive strength retrogression, i.e., the loss of compressive strength and increased permeability. Amorphous silica powder is also commonly utilized as a light weight filler and to increase the cement compressive strength by reacting with lime to form calcium-silicate-hydrate gel.

Heretofore, the crystalline and amorphous silica powder utilized have been combined with cement in mechanical blending equipment. As a result of the handling and mixing of the silica with the cement, significant amounts of the silica powder and dust are released into the atmosphere. Personnel in the area are often exposed to the powder and dust which can cause silicosis, a chronic disease of the lungs caused by the inhalation of silica powder and dust.

Thus, there is a need for eliminating the silica powder and dust produced during the handling and blending of silica with cement.

SUMMARY OF THE INVENTION

The present invention provides methods, cement compositions and oil suspensions of silica powder which are combined with the cement compositions without the production of significant silica powder or dust which meet the needs described above and overcome the deficiencies of the prior art.

The oil suspensions of silica powder of this invention are combined with cement and water in liquid form. Upon contacting the water, the oil suspension releases the suspended silica powder whereby it mixes with the cement and water without losses to the atmosphere. The oil suspensions of silica powder of this invention are basically comprised of silica powder, mineral oil, an oleophilic clay, an oleophilic surfactant and a hydrophilic surfactant.

The cement compositions of this invention are basically comprised of a hydraulic cement, water present in an amount sufficient to form a slurry and an oil suspension of silica powder that comprises silica powder, mineral oil, an oleophilic clay, an oleophilic surfactant and a hydrophilic surfactant.

The methods of this invention for cementing a subterranean zone penetrated by a well bore are comprised of the following steps. A cement composition is prepared or provided comprising a hydraulic cement, sufficient water to form a slurry and an oil suspension of silica powder that comprises silica powder, mineral oil, an oleophilic clay, an oleophilic surfactant and a hydrophilic surfactant. The cement composition is placed in a subterranean zone to be cemented and thereafter the cement composition is allowed to set into a solid mass therein.

The objects, features and advantages of the present invention will be readily apparent to those skilled in the art upon a reading of the description of preferred embodiments which follows.

DESCRIPTION OF PREFERRED EMBODIMENTS

As mentioned above, this invention provides oil suspensions of silica powder that can be quickly and easily added to a cement composition without the release of silica powder and dust. The oil suspensions can contain fine or coarse crystalline silica powder or amorphous silica powder, or both. When an oil suspension of silica powder of this invention is combined with a cement composition containing cement and water, the silica powder is released into the cement composition.

The oil suspensions of silica powder of this invention are comprised of silica powder, mineral oil, an oleophilic clay, an oleophilic surfactant and a hydrophilic surfactant. As mentioned, the silica powder in the oil suspension can be crystalline silica powder or amorphous silica powder, or both. Crystalline silica powder is utilized in cement compositions to prevent cement compressive strength retrogression at high temperatures. In addition to preventing the loss of compressive strength, the undesirable increase in cement permeability that also takes place is prevented. The presence of amorphous silica powder in the cement composition functions as a light weight filler and increases the compressive strength by reacting with lime to form calcium-silicate-hydrate gel.

The crystalline silica powder utilized in cement compositions can have a particle size in the general range of from about 15 microns to about 350 microns. The crystalline silica powder is generally present in the oil suspension in an amount in the range of from about 45% to about 52% by weight of the suspension. Amorphous silica powder has a particle size in the general range of from about 5 microns to about 25 microns. When used, the amorphous silica powder is generally present in the oil suspension in an amount in the range of from about 43% to about 47% by weight of the suspension.

When coarse crystalline silica powder is included in a cement composition, it usually has a particle size in the range of from about 175 microns to about 350 microns. Such coarse crystalline silica is commercially available under the trade designation "SSA-1™" from Halliburton Energy Services of Duncan, Okla. When fine crystalline silica powder is utilized in a cement composition, it usually has a particle size in the range of from about 16 microns to about 20 microns. Such a fine crystalline silica is commercially available from Halliburton Energy Services of Duncan, Okla. under the trade designation "SSA-2™". When amorphous silica powder is utilized, it usually has a particle size in the range of from about 5 microns to about 20 microns. Such amorphous silica is commercially available from Halliburton Energy Services of Duncan, Okla. under the trade designation "SILICALITE™".

When used, coarse crystalline silica powder is included in the oil suspension of this invention in an amount in the range of from about 47% to about 52% by weight of the suspension and fine crystalline silica is included in the oil suspension in an amount in the range of from about 47% to about 52% by weight of the suspension. When amorphous silica is used, it is generally present in the oil suspension in an amount in the range of from about 43% to about 47% by weight of the suspension.

The suspensions and methods of the present invention may be suitable for or used with any component of a cement composition that may be provided in powder form. Particularly suitable powders have a particle size in the range of from about 5 microns to about 350 microns. Examples of such components that may be provided in powder form include, but are not limited to, micro-silica, silica flour, fine silica flour, silica sand, fine particle size cement, ultra-fine particle size cement, fly ash, slag, vitrified shale and zeolite. In an embodiment of the invention, the powder is present in the suspension in an amount in the range of from about 43% to about 52% by weight of said suspension. Methods of using the suspensions include preparing or providing a cement composition comprising a hydraulic cement, sufficient water to form a slurry and an oil suspension of the powder that comprises mineral oil, an oleophilic clay, an oleophilic surfactant and a hydrophilic surfactant; placing said cement composition in a subterranean zone; and allowing said cement composition to set therein. The water is present in said cement composition in an amount in the range of from about 35% to about 65% by weight of hydraulic cement therein and the oil suspension is present in said cement composition in an amount in the range of from about 10% to about 70% by weight of hydraulic cement therein.

The mineral oil utilized in the oil suspension of this invention preferably has a viscosity at 100° F. in the range of from about 60 saybolt seconds to about 100 saybolt seconds, more preferably 70 saybolt seconds. The mineral oil is generally included in the oil suspension in an amount in the range of from about 40% to about 55% by weight of the oil suspension.

The oleophilic clay is included in the oil suspension to provide viscosity and texture to the mineral oil and to maintain the silica powder in suspension. The amount of oleophilic clay included in the oil suspension depends on the amount of silica to be suspended as well as the particle size of the silica powder. Generally, the oleophilic clay is present in the oil suspension in an amount in the range of from about 0.75% to about 5.5% by weight of the suspension. A particularly suitable oleophilic clay is commercially available from the Southern Clay Company of Gonzales, Tex.

The oleophilic surfactant included in the oil suspension functions to cause the clay particles to be coated with mineral oil and to readily become suspended therein. Examples of oleophilic surfactants that can be utilized include, but are not limited to, sorbitantrioleate, sorbitantrilaurate, sorbitantripalmitate, sorbitantristearate and sorbitantrisesquioleate. Of these, sorbitantrioleate is preferred. The oleophilic surfactant utilized is generally included in the oil suspension in an amount of the range of from about 0.1% to about 0.2% by weight of the oil suspension.

The hydrophilic surfactant in the oil suspension functions to release the suspended silica from the oil suspension when the oil suspension is combined with a cement composition containing water. When released, the silica powder is dispersed in the cement composition by stirring or blending. Examples of hydrophilic surfactants which can be utilized include, but are not limited to, polyethoxylated sorbitantrioleate, polyethoxylated sorbitantrilaurate, polyethoxylated sorbitantripalmitate, polyethoxylated sorbitantristearate and polyethoxylated sorbitantrisesquioleate. Of these, polyethoxylated sorbitantrioleate is preferred. The term "polyethoxylated" is used herein to mean that the surfactant is substituted with at least 20 moles of ethylene of oxide. The hydrophilic surfactant utilized is generally present in the oil suspension in an amount in the range of from about from about 2.5% to about 3.5% by weight of the suspension.

A particularly suitable oil suspension of this invention containing coarse crystalline silica having a particle size in the range of from about 175 microns to about 350 microns is comprised of the following components: coarse crystalline silica present in an amount of about 50% by weight of the oil suspension; mineral oil having a viscosity at 100° F. of 70 saybolt seconds present in an amount of about 42.9% by weight of the suspension; oleophilic clay present in an amount of about 4% by weight of the suspension; a sorbitantrioleate oleophilic surfactant present in an amount of about 0.1% by weight of the suspension; and a polyethoxylated sorbitantrioleate hydrophilic surfactant present in an amount of about 3% by weight of the suspension.

A particularly suitable oil suspension of fine crystalline silica having a particle size in the range of from about 16 microns to about 20 microns is comprised of the following components: fine crystalline silica present in an amount of about 50% by weight of the oil suspension; mineral oil having a viscosity at 100° F. of 70 saybolt seconds present in an amount of about 43.9% by weight of the suspension; oleophilic clay present in an amount of about 3% by weight of the suspension; a sorbitantrioleate oleophilic surfactant present in an amount of about 0.1% by weight of the suspension; and a polyethoxylated sorbitantrioleate hydrophilic surfactant present in an amount of about 3% by weight of the suspension.

A particularly suitable oil suspension of amorphous silica having a particle size in the range of from about 5 to about 20 microns is comprised of the following components: amorphous silica present in an amount of about 45% by weight of the suspension; mineral oil having a viscosity at 100° F. of 70 saybolt seconds present in an amount 50.9% by weight of the suspension; oleophilic clay present in an amount of about 1% by weight of the suspension; a sorbitantrioleate oleophilic surfactant present in an amount of about 0.1% by weight of the suspension; and a polyethoxylated sorbitantrioleate hydrophilic surfactant present in an amount of about 3% by weight of the suspension.

A cement composition of this invention is comprised of the following components: a hydraulic cement, water present in an amount sufficient to form a slurry and an oil suspension of silica powder that comprises silica powder, mineral oil, an oleophilic clay, an oleophilic surfactant and a hydrophilic surfactant.

As is well understood by those skilled in the art, the cement compositions of this invention can also include a dispersant, a set retarder, a fluid loss control additive, a light weight or heavy weight additive and other additives depending on the well conditions.

Examples of hydraulic cements which can be utilized in the cement compositions include, but are not limited to, Portland cements, slag cements, pozzolana cements, gypsum cements, aluminous cements, alkaline cements and mixtures thereof. Of these, Portland cement is preferred.

The water utilized in the cement compositions can be fresh water or salt water. The term "salt water" is used herein to mean unsaturated salt solutions and saturated salt solutions including brines and seawater. The water is present in the cement composition in an amount sufficient to form a slurry which is generally in the range of from about 35% to about 65% water by weight of hydraulic cement in the cement composition.

The oil suspension containing the crystalline and/or amorphous silica powder is present in the cement composition in an amount in the range of from about 10% to about 70% by weight of hydraulic cement therein.

The components in the oil suspension, i.e., silica powder, mineral oil, an oleophilic clay, an oleophilic surfactant and a hydrophilic surfactant are the same as those described above and are present in the amounts set forth above.

The methods of cementing a subterranean zone penetrated by a well bore of this invention are basically comprised of the following steps. A cement composition is prepared or provided comprising a hydraulic cement, sufficient water to form a slurry and an oil suspension of silica powder that comprises silica powder, mineral oil, an oleophilic clay, an oleophilic surfactant and a hydrophilic surfactant. The cement composition is placed in the subterranean zone to be cemented and thereafter the cement composition is allowed to set into a solid mass therein. The components of the cement composition and the components of the oil suspension of silica powder are the same as those described above and are present in the amounts set forth above. As mentioned above, various well known additives can also be included in the cement composition.

In an embodiment of the invention, an oil suspension of silica powder comprises: silica powder; mineral oil; an oleophilic clay; an oleophilic surfactant; and a hydrophilic surfactant.

In an embodiment of the invention, the cement composition comprises: a hydraulic cement; water present in an amount sufficient to form a slurry; and an oil suspension of silica powder that comprises silica powder, mineral oil, an oleophilic clay, an oleophilic surfactant and a hydrophilic surfactant.

In an embodiment of the invention, a method of cementing a subterranean zone penetrated by a well bore comprises: (a) preparing or providing a cement composition comprising a hydraulic cement, sufficient water to form a slurry and an oil suspension of silica powder that comprises silica powder, mineral oil, an oleophilic clay, an oleophilic surfactant and a hydrophilic surfactant; (b) placing the cement composition in the subterranean zone; and (c) allowing the cement composition to set into a solid mass therein.

In order to further illustrate the oil suspensions of silica powder of this invention, the following examples are given:

EXAMPLE 1

A mineral oil suspension of coarse silica having a particle size in the range of from 175 microns to 350 microns was prepared comprised of 50% coarse silica, 42.9% mineral oil having a viscosity at 100° F. of 70 saybolt seconds, 4% oleophilic clay, 0.1% sorbitantrioleate oleophilic surfactant and 3% polyethoxylated sorbitantrioleate hydrophilic surfactant (ethoxylated with 20 moles of ethylene oxide), all by weight of the oil suspension. The mixture was thoroughly stirred and allowed to stand at room temperature until it attained a temperature in the range of from 70 to 75° F. A sample of the oil suspension was then placed in a centrifuge tube and subjected to 6 minutes of rotation at 1,000 revolutions per minute. The resulting oil suspension did not exhibit separation, settling or sludging over time.

EXAMPLE 2

A mineral oil suspension of fine silica having a particle size in the range of from 16 to 20 microns was prepared comprised of 50% fine silica, 43.9% mineral oil having a viscosity at 100° F. of 70 saybolt seconds, 3% oleophilic clay, 0.1% sorbitantrioleate oleophilic surfactant and 3% polyethoxylated sorbitantrioleate hydrophilic surfactant (substituted with 20 moles of ethylene oxide), all by weight of the oil suspension. The mixture was thoroughly stirred and allowed to stand at room temperature until it attained a temperature in the range of from 70 to 75° F.

A sample of the oil suspension was then placed in a centrifuge tube and subjected to 6 minutes of rotation at 1,000 revolutions per minute. The resulting oil suspension did not exhibit separation, settling or sludging over time.

EXAMPLE 3

A mineral oil suspension of amorphous silica having a particle size in the range of from 5 to 20 microns was prepared comprised of 45% amorphous silica, 50.9% mineral oil having a viscosity at 100° F. of 70 saybolt seconds, 1% oleophilic clay, 0.1% sorbitantrioleate oleophilic surfactant and 3% polyethoxylated sorbitantrioleate hydrophilic surfactant (ethoxylated with 20 moles of ethylene oxide), all by weight of the oil suspension. The mixture was thoroughly stirred and allowed to stand at room temperature until it attained a temperature in the range of from 70 to 75° F. A sample of the oil suspension was then placed in a centrifuge tube and subjected to 6 minutes of rotation at 1,000 revolutions per minute. The resulting oil suspension did not exhibit separation, settling or sludging over time.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:
   a hydraulic cement;
   water present in an amount sufficient to form a slurry; and
   an oil suspension of silica powder that comprises silica powder, mineral oil, an oleophilic clay, an oleophilic surfactant and a hydrophilic surfactant.

2. The cement composition of claim 1 wherein said hydraulic cement is selected from the group consisting of Portland cements, slag cements, pozzolana cements, gypsum cements, aluminous cements, alkaline cements and combinations thereof.

3. The cement composition of claim 1 wherein said hydraulic cement is Portland cement.

4. The cement composition of claim 1 wherein said water is selected from the group consisting of fresh water and salt water.

5. The cement composition of claim 1 wherein said water is present in said cement composition in an amount in the range of from about 35% to about 65% by weight of hydraulic cement therein.

6. The cement composition of claim 1 wherein said oil suspension is present in said cement composition in an amount in the range of from about 10% to about 70% by weight of hydraulic cement therein.

7. The cement composition of claim 1 wherein said silica powder in said oil suspension is selected from the group consisting of crystalline silica, amorphous silica and combinations thereof.

8. The cement composition of claim 1 wherein said silica powder in said oil suspension is crystalline silica powder having a particle size in the general range of from about 15 microns to about 350 microns.

9. The cement composition of claim 8 wherein said crystalline silica powder is present in said oil suspension in an amount in the range of from about 45% to about 52% by weight of said oil suspension.

10. The cement composition of claim 1 wherein said silica powder in said oil suspension is amorphous silica powder having a particle size in the general range of from about 5 microns to about 25 microns.

11. The cement composition of claim 10 wherein said amorphous silica powder is present in said oil suspension in an amount in the range of from about 43% to about 47% by weight of said oil suspension.

12. The cement composition of claim 1 wherein said mineral oil in said oil suspension has a viscosity of 100° F. in the range of from about 60 saybolt seconds to about 100 saybolt seconds and is present in said oil suspension in an amount in the range of from about 40% to about 55% by weight of said oil suspension.

13. The cement composition of claim 1 wherein said oleophilic clay is present in said oil suspension in an amount in the range of from about 0.75% to about 5.5% by weight of said oil suspension.

14. The cement composition of claim 1 wherein said oleophilic surfactant in said oil suspension is selected from the group consisting of sorbitantrioleate, sorbitantrilaurate, sorbitantripalmitate, sorbitantristearate and sorbitantrisesquioleate.

15. The cement composition of claim 1 wherein said oleophilic surfactant in said oil suspension is sorbitantrioleate.

16. The cement composition of claim 1 wherein said oleophilic surfactant is present in said oil suspension in an amount in the range of from about 0.1% to about 0.2% by weight of said oil suspension.

17. The cement composition of claim 1 wherein said hydrophilic surfactant in said oil suspension is selected from the group consisting of polyethoxylated sorbitantrioleate, polyethoxylated sorbitantrilaurate, polyethoxylated sorbitantripalmitate, polyethoxylated sorbitantristearate and polyethoxylated sorbitantrisesquioleate.

18. The cement composition of claim 1 wherein said hydrophilic surfactant in said oil suspension is polyethoxylated sorbitantrioleate.

19. The cement composition of claim 1 wherein said hydrophilic surfactant is present in said oil suspension in an amount in the range of from about 2.5% to about 3.5% by weight of said oil suspension.

20. An oil suspension comprising a powder selected from the group consisting of micro-silica, silica flour, fine silica flour, silica sand, fine particle size cement, ultra-fine particle size cement, fly ash, slag, vitrified shale and zeolite; mineral oil; an oleophilic clay; an oleophilic surfactant; and a hydrophilic surfactant.

21. The oil suspension of claim 20 wherein said powder has a particle size in the range of from about 5 microns to about 350 microns.

22. The oil suspension of claim 20 wherein said powder is present in said suspension in an amount in the range of from about 43% to about 52% by weight of said suspension.

23. A cement composition comprising:
a hydraulic cement;
water present in an amount sufficient to form a slurry; and
an oil suspension comprising a powder selected from the group consisting of micro-silica, silica flour, fine silica flour, silica sand, fine particle size cement, ultra-fine particle size cement, fly ash, slag, vitrified shale and zeolite; mineral oil; an oleophilic clay; an oleophilic surfactant; and a hydrophilic surfactant.

24. The cement composition of claim 23 wherein said powder has a particle size in the range of from about 5 microns to about 350 microns.

25. The cement composition of claim 23 wherein said powder is present in said suspension in an amount in the range of from about 43% to about 52% by weight of said suspension.

26. The cement composition of claim 23 wherein said hydraulic cement is selected from the group consisting of Portland cements, slag cements, pozzolana cements, gypsum cements, aluminous cements, alkaline cements and combination thereof.

27. The cement composition of claim 23 wherein said hydraulic cement is Portland cement.

28. The cement composition of claim 23 wherein said water is selected from the group consisting of fresh water and salt water.

29. The cement composition of claim 23 wherein said water is present in said cement composition in an amount in the range of from about 35% to about 65% by weight of hydraulic cement therein.

30. The cement composition of claim 23 wherein said oil suspension is present in said cement composition in an amount in the range of from about 10% to about 70% by weight of hydraulic cement therein.

* * * * *